United States Patent Office 3,525,754
Patented Aug. 25, 1970

3,525,754
**PREPARATION OF 3-OXABICYCLO[3.1.1]
HEPTANE-2-ONE**
Gilbert H. Berezin, West Chester, Pa., assignor to E. I. du Pont de Nemours and Company, Wilmington, Del., a corporation of Delaware
No Drawing. Filed Dec. 30, 1966, Ser. No. 606,033
Int. Cl. C07d 7/06
U.S. Cl. 260—343.5
3 Claims

ABSTRACT OF THE DISCLOSURE

Process for the preparation of 3-oxabicyclo[3.1.1]heptane-2-one comprising heating the trans form of a 3-hydroxymethylcyclobutane-carboxylate in the presence of a transesterification catalyst. This compound is readily converted to certain substantially pure cis-1,3-difunctionally substituted cyclobutanes that are useful polymer intermediates.

BACKGROUND OF THE INVENTION

Difunctional cyclobutane derivatives recently have been found useful as intermediates in polymer manufacture. For example, U.S. Pat. 3,074,914 discloses processes for making polymers of 1,3-cyclobutanedicarboxylic acid, and commonly assigned copending application S.N. 287,194, filed June 12, 1963, now abandoned describes preparation of polymers from 1,3-cyclobutanedimethanol. Cyclobutane derivatives, however, exist in stereoisomeric forms, and the cis and trans isomers give polymers having different properties. Thus it is advantageous to have processes for making the pure isomers in order to obtain maximum freedom for making polymers with the desired properties.

The present invention makes possible the direct preparation of substantially pure cis-1,3-difunctionally substituted cyclobutanes, i.e., cis isomers can be formed to the substantial exclusion of trans isomers, thus eliminating the need for an isomer separation step.

DESCRIPTION OF THE INVENTION

The compound prepared by the process of the present invention is 3-oxabicyclo[3.1.1]heptane-2-one:

As will subsequently be shown, this compound is readily converted to certain substantially pure cis-1,3-difunctionally substituted cyclobutanes that are useful polymer intermediates.

3-oxabicyclo[3.1.1]heptane-2-one is prepared by a novel process which comprises heating a 3-hydroxymethylcyclobutanecarboxylate,

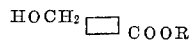

wherein R is aliphatic hydrocarbon of up to 10 carbons, in the presence of a transesterification catalyst at a temperature above the boiling point of the alcohol (ROH) from which the ester moiety is derived, but below about 350° C., and collecting the resulting distillate.

Conversion of the carboxylate to 3-oxabicyclo[3.1.1]heptane-2-one apparently occurs in two stages. First, the carboxylate forms a low-molecular weight polymer (oil) with simultaneous evolution of alcohol (ROH); and second, the polymer decomposes to the desired product, which forms as a white solid distillate. The alcohol may be condensed and collected in a receiver, and the 3-oxabicyclo[3.1.1]heptane-2-one is collected in the same or a different receiver. In the first case, the solid distillate will dissolve in the alcohol and be recovered, e.g., by distillations; and in the second case, which is preferred, the product is collected as a solid, which can be purified, e.g., by recrystallization from solution. Although it is not essential, the process generally is conducted under a partial vacuum, e.g., less than about 150 mm. of mercury, to speed up both stages of the reaction, particularly the second stage.

The process preferably is performed in two steps to give maximum control of both reaction stages. In the first step, the 3-hydroxymethylcyclobutanecarboxylate is heated in the presence of the transesterification catalyst at a temperature above the boiling point of the alcohol (ROH) from which the ester moiety is derived, and preferably within the range of about from 160 to 240° C., until formation of liquid distillate (ROH) substantially ceases. The temperature is then increased to at least about 250° C., preferably about from 280 to 320° C., until formation of solid distillate is substantially complete, which will generally take about 2 to 4 hours. This solid distillate, primarily 3-oxabicyclo[3.1.1]heptane-2-one, is then purified in the manner previously indicated.

The catalyst can be any of the art-recognized transesterification catalysts. For example, it can be acidic or basic and includes such materials as manganous acetate, calcium acetate, red lead oxide ($Pb_3O_4$), lithrage, sodium methoxide, sodium hydrogen hexabutoxytitanate, tetraalkyl titanates such as tetraisopropyl titanate, sodium methyl carbonate, aluminum alkoxides such as aluminum isopropoxide, calcium ethoxide, magnesium ethoxide, sulfonic acid ion exchange resins, sulfuric acid, antimony oxychloride, cobaltous chloride, manganese carbonate, sodium titanate, zinc dust, zinc salicylate, sodium acid glycollate, strontium hydroxide, titanium dioxide, cadmium hydroxide, magnesium borate, iron(II) oxalate, or aluminum triformate.

Especially preferred transesterification catalysts are titanium hexalkoxides of the formulas $MHTi(OR)_6$, $M_2Ti(OR)_6$, $M'(HTi(OR)_6)_2$, or $M'Ti(OR)_6$, wherein M is an alkali metal, M' is an alkaline earth metal and R is alkyl of 1 to 6 carbon atoms. These catalysts are more fully described in U.S.P. 2,720,502 as polymerization catalysts.

The quantity of transesterification catalyst used is not critical, but will generally be 0.05 to 5% of the weight of the hydroxyester and preferably about from 0.1 to 0.5%. When the catalyst is reactive with oxygen, as is the case with the above titanium hexalkoxides, the process is best conducted in an inert atmosphere such as nitrogen.

The 3-hydroxymethylcyclobutanecarboxylate can be in the cis and/or trans form and is the ester (—COOR) of an alcohol (ROH), wherein R is an aliphatic hydrocarbon group of up to 10 carbons. Representative R groups are methyl, ethyl, propyl, butyl, isobutyl, pentyl, hexyl, heptyl, decyl, allyl, propargyl, etc. Because the alcohols from which they are derived are more readily available, esters wherein the R group is straight chain alkyl are preferred, with R's of 1 to 4 carbons being particularly preferred.

As previously indicated, 3-oxabicyclo[3.1.1]heptane-2-one is readily converted to cis-1,3-functionally substituted cyclobutanes which are useful polymer intermediates. To illustrate, 3-oxabicyclo[3.1.1]heptane-2-one is converted to substantially pure cis-1,3-cyclobutanedimethanol by hydrogenation in the presence of copper chromite catalyst at temperatures of about from 125 to 300° C. and hydrogen pressures of about 200 to 1000 atmospheres. The copper chromite catalyst can be prepared by the methods described in "Newer Methods of Preparative Organic Chemistry," Interscience, 1948, page 107. Hydrogenation preferably is effected at temperatures of 150 to 180° C. and in a solvent for the lactone, e.g., an alcohol such as methanol, ethanol, isopropanol, butanol, n-propanol; an ether such as dioxane, diethyl ether, tetrahydrofuran; or a hydrocarbon such as cyclohexane and methylcyclohexane.

The 3-oxabicyclo [3.1.1]heptane-2-one can be oxidized to cis-1,3-cyclobutanedicarboxylic acid with aqueous nitric acid having a concentration of about from 5 to 70%, by weight, and preferably from 35 to 45% at a temperature of about from 50 to 100° C., preferably from 60 to 80° C. The oxidation is substantially complete when evolution of nitrogen oxide ceases. No appreciable quantity of trans isomer is formed. The diacid is recovered by conventional means such as recrystallization from a solvent. The crude diacid can also be esterified by conventional means and purified by distillation.

Also, 3-oxabicyclo[3.1.1]heptane-2-one can be hydrolyzed in a conventional manner to give cis-3-hydroxymethylcyclobutanecarboxylic acid or its esters. In the first case, the hydrolysis is carried out by heating the lactone in the presence of at least one mole of water per mole of lactone and preferably 10 to 20 moles or more per mole of lactone, at a temperature of about from 60 to 100° C. in the presence of an acidic catalyst such as sulfuric acid, p-toluenesulfonic acid, phosphoric acid, hydrochloric acid, oxalic acid, perchloric acid, polystyrenesulfonic acid ion exchange resins, and the like. The acid catalyst is used in a proportion of about from 0.5 to 10% based on the weight of the lactone and preferably about from 1 to 3%.

If an ester is desired, the lactone is solvolyzed by a substantially anhydrous alcohol under the same conditions and in the presence of the same acidic catalysts used for aqueous hydrolysis. Typical alcohols are methanol, ethanol, ethenol, isopropanol, propionol, isobutanol, tert-butanol, pentanol, hexanol, phenol, benzyl alcohol, cresol, m-octanol, m-nonanol, and dodecanol. If the ester is to be hydrogenated as described below, the alcohol from which it is derived preferably is free or reducible groups. Isolation of the cis-3-hydroxymethylcyclobutanecarboxylic acid or carboxylate is by conventional means such as distillation.

Essentially pure cis-1,3-cyclobutanedimethanol can also be prepared by hydrogenating one of the above cis-3-hydroxymethylcyclobutanecarboxylate esters under the same conditions described hereinbefore for the hydrogenation of 3-oxabicyclo[3.1.1]heptane-2-one, or by first esterifying cis-1,3-cyclobutanedicarboxylic acid in a conventional manner, and then hydrogenating the diester under the conditions described above for the hydrogenation of 3-oxabicyclo[3.1.1]heptane-2-one.

From the foregoing, it is seen that the process of the present invention provides means for converting trans-3-hydroxymethylcyclobutanecarboxylates and their stereoisomeric mixtures to 3-oxabicyclo[3.1.1]heptane-2-one, a novel lactone which is readily converted to substantially pure cis-1,3-cyclobutanedimethanol, cis-1,3-cyclobutanedicarboxylic acid, or cis-3-hydroxymethylcyclobutanecarboxylic acid or its ester. These cis compounds can, in turn, be polymerized as described in U.S. 3,074,914 or aforesaid pending application S.N. 287,194, filed June 12, 1963, now abandoned.

The following examples illustrate the invention. All parts and percentages are by weight unless otherwise indicated.

Example 1.—Preparation of 3-oxabicyclo[3.1.1]heptane-2-one

To 7 parts of a 3:2 mixture of the cis and trans isomers of ethyl 3-hydroxymethylcyclobutanecarboxylate in a 10 ml. flask fitted with a claisan head, there is added 0.01 part of $Pb_3O_4$ (transesterification catalyst). The resulting mixture is heated to 140° C. under nitrogen with removal of ethanol at 150 mm. The temperature of the ester rises from 150° to 190° C., and distillation ceases. The receiver is changed, and the pot residue (distilland) is heated at about 250° C. under 0.5–01 mm. vacuum. A white crystalline solid begins to sublime into the head and is driven into the receiver with a heat gun. After distillation ceases, the white solid distillate is recrystallized from acetone and found by analysis to be 3-oxabicyclo[3.1.1]heptane-2-one.

The infrared spectrum has strong bands as follows: $\lambda_{max}$ $CCl_4$ 2960, 1760, 1205, 1035 and 980 cm.$^{-1}$. The NMR spectrum has a peak at $5.58\tau$ equal to four units and from $8.13-8.27\tau$ equal to two units (ring hydrogens) (tetramethylsilane standard). Molecular weight determined by mass spectroscopy is 112.

Analysis.—Calcd. for $C_6H_8O_2$(112) (percent): C, 64.27; H, 7.19. Found (percent): C, 64.13; H, 7.20.

Example 2.—Preparation of 3-oxabicyclo[3.1.1]heptane-2-one

A mixture of 10 parts of ethyl 3-hydroxymethylcyclobutanecarboxylate (a 3:2 mixture of the trans and cis isomers) and 0.5 part of a 10% solution of sodium hydrogen hexabutoxytitanate in n-butyl alcohol is placed in a 25 ml. flask equipped for distillation in a nitrogen atmosphere. The solution is heated at 170–180° until no additional liquid distills (2.5 parts of volatile liquid was collected). The residue is then heated to 280–300° under partial vacuum (15 mm.) in nitrogen until no additional solid distillate is formed (~2 hr.). The white solid distillate is recrystallized from acetone to yield 6 parts (86%) of 3-oxabicyclo[3.1.1]heptane-2-one.

The above reaction is repeated using 90 parts of ethyl 3-hydroxymethylcyclobutanecarboxylate and 4.5 parts of disodium hexabutoxytitanate. A 93% yield of 3-oxabicyclo [3.1.1]heptane-2-one is obtained.

Substantially the same result is obtained when methyl, propyl, butyl, isobutyl, pentyl, hexyl, heptyl, decyl, allyl or propargyl 3-hydroxymethylcyclobutanecarboxylate is substituted for ethyl 3-hydroxymethylcyclobutanecarboxylate in the process of Example 2, and the initial temperature is maintained above the boiling point of the alcohol until distillation of the alcohol substantially ceases.

Example 3.—Preparation of cis-1,3-cyclobutanedimethanol

To a 300 ml. stainless steel bomb there is added 40 parts of 3-oxabicyclo[3.1.1]heptane-2-one dissolved in 120 parts of anhydrous ethanol and 40 parts of copper chromite catalyst. The bomb is sealed and pressurized to 272 atm. with hydrogen. The bomb is heated to 175° and the pressure rises to approximately 408 atm. Shaking is begun and continued for three hours. The bomb is cooled, vented, and the contents removed. After rinsing the bomb with two small portions of methanol, the catalyst is removed from the solution by filtration through a Celite pad. After removing the solvent at reduced pressure on a rotary evaporator, the residual oil is distilled at reduced pressure with a small spinning band to yield 38.7 parts (95%) of cis-1,3-dihydroxymethylcyclobutane, B.P. 84° (0.1 mm.).

Analysis of the product by gas chromatography on a 6' x ¼" column packed with 20% "Carbowax 20M" on super support at 190° indicated the presence of only one component. The infrared spectrum of the product is identical with that of pure cis-1,3-cyclobutanedimethanol.

The product is further characterized as its di-urethane derivative, M.P. 143–144° after recrystallization from carbon tetrachloride. The infrared spectrum of this derivative exhibits a singlet at 8.18μ in contrast to the corresponding trans material that shows a doublet in this region.

Analysis.—Calcd. for $C_{20}H_{22}O_4N_2$ (percent): C, 67.78; H, 6.26. Found (percent): C, 67.63; H, 6.35.

Example 4.—Preparation of ethyl cis-3-hydroxymethylcyclobutane carboxylate

A solution of 22.4 parts of 3-oxabicyclo[3.1.1]heptane-2-one, 0.5 part of p-toluenesulfonic acid, and 120 parts of anhydrous ethanol is heated under reflux overnight. After most of the ethanol has been removed at reduced pressure on a rotary evaporator, the residue is dissolved in ether and extracted with saturated sodium bicarbonate solution. The ether solution is extracted with saturated ammonium chloride solution and dried over anhydrous magnesium sulfate. After removal of the solvent, gas chromatography analysis of the residual liquid indicates the presence of only one major component, the retention time of which corresponds to that of authentic cis-ethyl 3-hydroxymethylcyclobutanecarboxylate, and a trace amount of unreacted lactone. The liquid is distilled with a small spinning band column to give 23 g. (74%) of product, B.P. 68° (0.3 mm.). The infrared spectrum of the distilled product is identical with that of authentic cis-ethyl 3-hydroxymethylcyclobutanecarboxylate.

The above procedure is repeated substituting water for the anhydrous ethanol, and cis-3-hydroxymethylcyclobutanecraboxylic acid is obtained.

When the ethyl cis-3-hydroxymethylcyclobutanecarboxylate obtained above is hydrogenated according to the procedure of Example 3, cis-1,3-cyclobutanedimethanol is obtained.

Example 5.—Preparation of cis-1,3-cyclobutanedicarboxylic acid

A stirred solution of 105 parts of concentrated nitric and 75 parts of water is heated to 75° C. After adding a small piece of copper wire and removing the heating mantle, solid 3-oxabicyclo[3.1.1]heptane-2-one (25 parts) is added at such a rate to maintain the reaction mixture at 70–75° C. After the addition is completed, the solution is allowed to cool and transferred to an evaporating dish. After removal of the solvent with a stream of air, there is isolated 30 parts (94%) of white crystalline product (M.P. 128–131°). The material is recrystallized from nitromethane to give 23 g. of crystalline diacid (M.P. 132–134° corr). The p-bromophenacyl ester of the diacid is prepared in the usual manner; M.P. 186–187°. A small sample is esterified with diazomethane and passed through a gas chromatograph. The resulting chromatogram indicates the presence of only one component, the cis-diester.

Neut. equiv. calcd. for $C_6H_8O_4$(144) (percent): 72.0. Found (percent): 71.7.

*Analysis.*—Calcd. for $C_6H_8O_4$ (percent): C, 50.00; H, 5.60. Found (percent): C, 50.25; H, 5.63.

Example 6.—Poly cis(cyclobutane-1,3-dimethylene 4,4′-bibenzoate)

Into a small polymer tube is placed 14.30 parts of dimethyl 4,4′-bibenzoate, 7.41 parts of cis-1,3-cyclobutanedimethanol, and 0.5 part of an 8% solution of sodium hydrogen hexabutoxytitanate in n-butanol as a catalyst. The ingredients are melted and a capillary for nitrogen is inserted into the polymer tube. Ester exchange is carried out for 2.5 hours at 230° C. with evolution of methanol, after which the flow of inert gas is changed from nitrogen to xylene, the temperature is raised to 290° C., and vacuum is applied gradually until the pressure is reduced to 0.07 mm. of mercury. After 2.5 hours of polymerization at this temperature and pressure with a continuous slow stream of xylene maintained through the tube, the mixture is cooled and a white solid polymer is produced. The polymer-melt temperature (PMT) is 285° C. The "polymer-melt temperature," abbreviated "PMT," is defined as that temperature where a polymer sample becomes molten and leaves a trail when moved across a hot metal surface with moderate pressure. Practical considerations in PMT determinations are discussed by Sorenson and Campbell in "Preparative Methods of Polymer Chemistry," Interscience Publishers, Inc., N.Y., pages 49–50 (1961).

The above polymer is easily cast into various solid-shaped objects and also melt-spun into tough, flexible fibers.

I claim:

1. A process for preparing 3-oxabicyclo[3.1.1]heptane-2-one which comprises heating the trans form of an ester of the formula

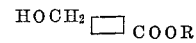

wherein R is aliphatic hydrocarbon of up to 10 carbons, in the presence of a transesterification catalyst and at a temperature above the boiling point of the alcohol ROH from which the ester is derived and within the range of about from 160 to 240° C. until distillation of the alcohol ROH substantially ceases, heating the remaining distilland under partial vacuum to a temperature of about from 280 to 320° C., and collecting the resulting distillate.

2. The process of claim 1 wherein R is alkyl of 1 to 4 carbons.

3. The process of claim 2 wherein said catalyst is a titanium hexalkoxide and both heating steps are conducted in an inert atmosphere.

References Cited

Finar: Organic Chemistry, vol. 2, Longmans, 1959 (pp. 119 to 121 relied on).

Groggins: Unit Processes in Organic Synthesis, 1947, pp. 635–637.

ALEX MAZEL, Primary Examiner

A. M. T. TIGHE, Assistant Examiner

U.S. Cl. X.R.

260—75, 468, 504, 617